US011035546B2

(12) United States Patent
Chen et al.

(10) Patent No.: US 11,035,546 B2
(45) Date of Patent: Jun. 15, 2021

(54) REAR COVER OF VEHICLE LAMP HAVING VALVE STRUCTURE AND INFRARED RADIATION DRYING AND AIR DISCHARGING FUNCTION

(71) Applicant: PANASIAN MICROVENT TECH (JIANGSU) CORPORATION, Jiangsu (CN)

(72) Inventors: Weihong Chen, Jiangsu (CN); Qi Wang, Jiangsu (CN); Ronghua Ding, Jiangsu (CN); Haimin Song, Jiangsu (CN); Yufeng Chen, Jiangsu (CN); Xiaojun Xue, Jiangsu (CN); Zhichao Wu, Jiangsu (CN); Changying Qin, Jiangsu (CN)

(73) Assignee: PANASIAN MICROVENT TECH (JIANGSU) CORPORATION, Changzhou (CN)

( * ) Notice: Subject to any disclaimer, the term of this patent is extended or adjusted under 35 U.S.C. 154(b) by 0 days.

(21) Appl. No.: 16/893,433

(22) Filed: Jun. 4, 2020

(65) Prior Publication Data
US 2020/0300439 A1    Sep. 24, 2020

Related U.S. Application Data

(63) Continuation of application No. PCT/CN2018/095344, filed on Jul. 12, 2018.

(30) Foreign Application Priority Data

Jun. 5, 2018 (CN) .......................... 201810567162.1

(51) Int. Cl.
*F21S 45/33*     (2018.01)
*F21S 45/60*     (2018.01)
*F21S 41/20*     (2018.01)

(52) U.S. Cl.
CPC ............. *F21S 45/33* (2018.01); *F21S 41/285* (2018.01); *F21S 45/60* (2018.01)

(58) Field of Classification Search
CPC ........... F21S 45/285; F21S 45/60; F21S 45/33
See application file for complete search history.

(56) References Cited

U.S. PATENT DOCUMENTS 10,408,415 B2 *  9/2019  Beauchamp ......... B60Q 1/0017
10,451,244 B2 * 10/2019  Berrezai ................. F21S 45/49
(Continued)

FOREIGN PATENT DOCUMENTS

CN    202071463 U    12/2011
CN    103816774 A     5/2014

OTHER PUBLICATIONS

International Search Report of PCT Patent Application No. PCT/CN2018/095344 dated Jan. 23, 2019.

*Primary Examiner* — Anne M Hines

(57) ABSTRACT

The present application discloses a rear cover of a vehicle lamp having a valve structure and infrared radiation drying and air discharging function, which includes an end cover provided with a plurality of air vents, a connecting base for connecting with a vehicle lamp housing, and a membrane module for infrared radiation drying and air discharging. The end cover and the connecting base are assembled and connected to form the rear cover of the vehicle lamp. The membrane module is built in a cavity of the rear cover of the vehicle lamp. At least one valve is provided on a path of air circulation inside and outside the vehicle lamp housing through the rear cover of the vehicle lamp, and the at least one valve automatically opens and closes under impulse of air pressure difference.

9 Claims, 4 Drawing Sheets

(56) References Cited

U.S. PATENT DOCUMENTS

| | | | |
|---|---|---|---|
| 2005/0157514 A1* | 7/2005 | Brinkmann | B60Q 1/0005 362/547 |
| 2010/0109531 A1* | 5/2010 | Helms | B60Q 1/04 315/82 |
| 2016/0208997 A1* | 7/2016 | Silvi | F02M 35/10288 |

* cited by examiner

REAR COVER OF VEHICLE LAMP HAVING VALVE STRUCTURE AND INFRARED RADIATION DRYING AND AIR DISCHARGING FUNCTION

CROSS REFERENCE TO RELATED APPLICATIONS

The present application is a Continuation Application of PCT Application No. PCT/CN2018/095344 filed on Jul. 12, 2018, which claims the benefit of Chinese Patent Application No. 201810567162.1 filed on Jun. 5, 2018. All the above are hereby incorporated by reference.

TECHNICAL FIELD

The present disclosure relates to a rear cover of a vehicle lamp having a valve structure and infrared radiation drying and air discharging function.

BACKGROUND TECHNOLOGY

With the increase of aesthetic appreciation in automobile consumption in our country, the appearance of automobile models is mostly streamlined with curved surfaces. Especially when automobile headlights are the eyes of an automobile, their appearance becomes more curved, lively and aesthetic. Apart from the matured use of halogen bulbs and xenon lights in vehicle lamps, a new LED headlight technology has been added. Modernized vehicle lamps are becoming more and more complex in shape in order to pursue aesthetics, and this complex shape causes temperature difference in a vehicle lamp housing. Therefore, after the outside air (humidity) enters, it is very easy that fogging is generated and the safety of driving is affected. The curved surface of vehicle lamps and the new LED headlight technology make fogging and condensation on the inner surface of a portion of a transparent glass cover, such as a cold curved surface and sharp corner transition area more serious. The technology of removing fogging and condensation for foreign vehicles that is commonly used in our country cannot solve the problem of fogging and condensation in a vehicle lamp that can affect the safety of driving.

SUMMARY

The main technical problem to be solved by the present disclosure is to provide a rear cover of a vehicle lamp having a valve structure and infrared radiation drying and air-discharging function, which can ensure that there is no fogging and condensation in the housing of a vehicle lamp and electrical and electronic equipment so that electrical performance will not be affected by humid air environment and the entry of dust can be blocked.

In order to solve the above technical problems, a technical solution adopted by the present disclosure is to provide a rear cover of a vehicle lamp having a valve structure and infrared radiation drying and air discharging function, which includes an end cover provided with a plurality of air vents; a connecting base for connecting with a vehicle lamp housing; and a membrane module for infrared radiation drying and air discharging, wherein the end cover and the connecting base are assembled and connected to form the rear cover of the vehicle lamp, the membrane module is built in a cavity of the rear cover of the vehicle lamp, at least one valve is provided on a path of air circulation inside and outside the vehicle lamp housing through the rear cover of the vehicle lamp, and the at least one valve automatically opens and closes under impulse of air pressure difference.

In a preferred embodiment of the present application, the valve is only provided on the end cover, or the valve is provided on both the end cover and the connecting base.

In a preferred embodiment of the present application, a microporous membrane is provided on a periphery of the valve for protecting the valve in a clean state.

In a preferred embodiment of the present application, the valve is fixed in a partial fixation manner or in a full fixation manner around the periphery of the valve, when the partial fixation is adopted, an unfixed portion automatically opens and closes under effect of air pressure difference, and when full fixation around the periphery is adopted, an opening in the form of a flap formed on the valve automatically opens and closes the valve under effect of air pressure difference.

In a preferred embodiment of the present application, the valve is a silicone sheet or a plastic film.

In a preferred embodiment of the present application, the membrane module for infrared radiation drying and air discharging includes a cylindrical body and microporous membranes, wherein the end faces on both sides of the cylindrical body are connected with the microporous membranes, an interior of the cylindrical body is in the form of straight through bores separated by honeycomb hollows, and the interior is filled with a mixture of a reversible moisture-absorbing micro-grain substance and substance micro-powder particles that efficiently absorb far-infrared radiation energy.

In a preferred embodiment of the present application, the microporous membranes are membranes having two-way convection capability and water vapor permeable channels.

In a preferred embodiment of the present application, when the end faces on both sides of the cylindrical body are connected with the membranes having two-way convection capability and water vapor permeable channels, moisture in the vehicle lamp housing enters the interior of the cylindrical body through the water vapor permeable channels, passes through the mixture of the reversible moisture-absorbing micro-grain substance and the substance micro-powder particles that efficiently absorb far-infrared radiation energy, and is discharged from the water vapor permeable channels, and air from outside is dried and filtered through the membrane module and then enters an interior of the vehicle lamp housing, the air entering the vehicle lamp housing is dry air, at least one valve is provided on the path of air circulation inside and outside the vehicle lamp housing.

In a preferred embodiment of the present application, the reversible moist-absorbing micro-grain substance is one or more of a reversible desiccant, bentonite, silica aerogel, carbon molecular sieve, carbon aerogel adsorbent and water-absorbing resin; and the substance micro-powder particles that efficiently absorb far-infrared radiation energy include one or more of a carbon element product, biochar, tourmaline, far-infrared ceramics, zirconium carbide, metallic oxide, and silicon carbide.

The beneficial effects of the present disclosure are: the present disclosure can ensure that there is no fogging and condensation in the housings of vehicle lamps and electrical and electronic equipment, so that electrical performance will not be affected by humid air environment, and the surfaces of mirrors and smooth electronic components in the housings of electrical and electronic equipment of a vehicle will not become foggy, and the performance of the electrical and electronic equipment of the vehicle can be brought into play. This completely subverts the traditional methods of controlling and adjusting humidity in the housings of a vehicle in Europe, America and Japan. This can also block the entry of dust such that the electrical and electronic equipment in a vehicle is pollution-free and at a dust-tight level.

BRIEF DESCRIPTION OF THE DRAWINGS

In order to more clearly explain the technical solutions in the embodiments of the present disclosure, the necessary drawings to be used in the description of the embodiments will be briefly introduced below. Obviously, the drawings in the following description are only some embodiments of the present disclosure. For a person having ordinary skill in the art, without the exercise of creative efforts, other drawings may also be obtained according to the following drawings, wherein.

DETAILED DESCRIPTION OF THE EMBODIMENTS

The technical solution in the embodiments of the present disclosure will be clearly and completely described below. Obviously, the described embodiments are merely some embodiments of the present disclosure, but not all embodiments. Based on the embodiments of the present disclosure, all other embodiments obtained by a person of ordinary skill in the art without contribution of creative labor would fall within the scope of protection of the present disclosure.

Figure 1:
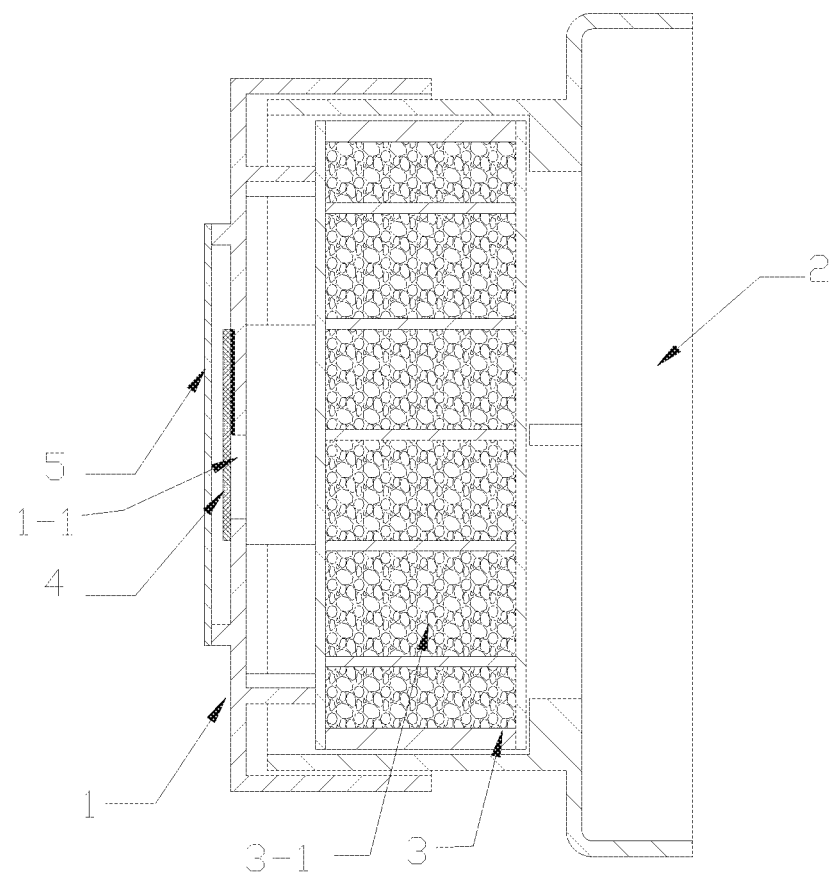
FIG. 1 is a schematic view of a preferred embodiment of the structure of a rear cover of a vehicle lamp having a valve structure and infrared radiation drying and air discharging function of the present application.
Figure 2:
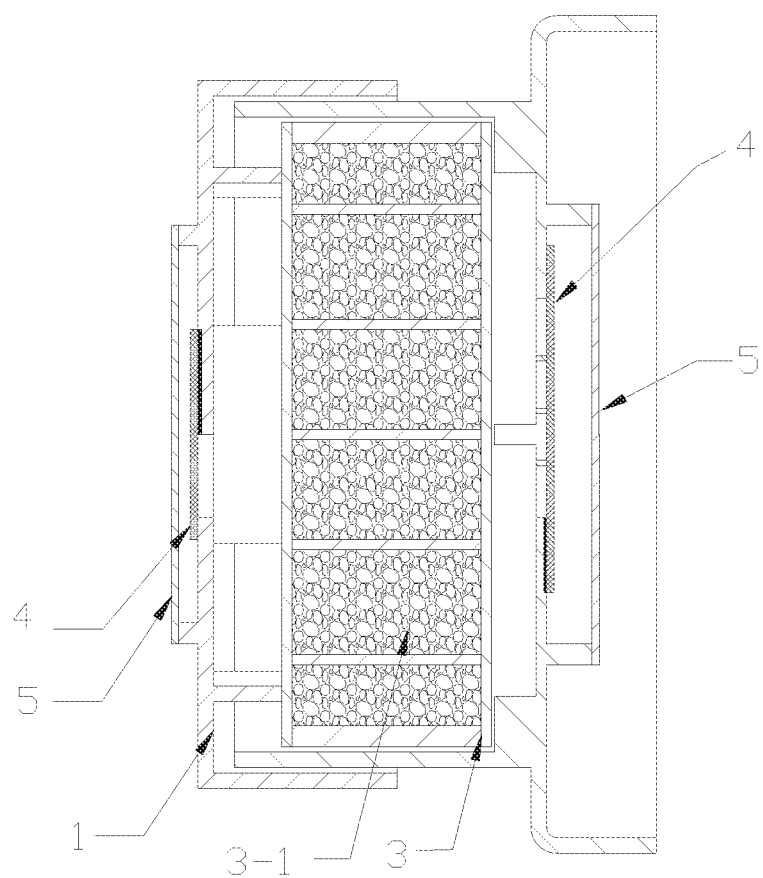
FIG. 2 is a schematic view of another preferred embodiment of the structure of a rear cover of a vehicle lamp having a valve structure and infrared radiation drying and air discharging function of the present application.
Figure 3:
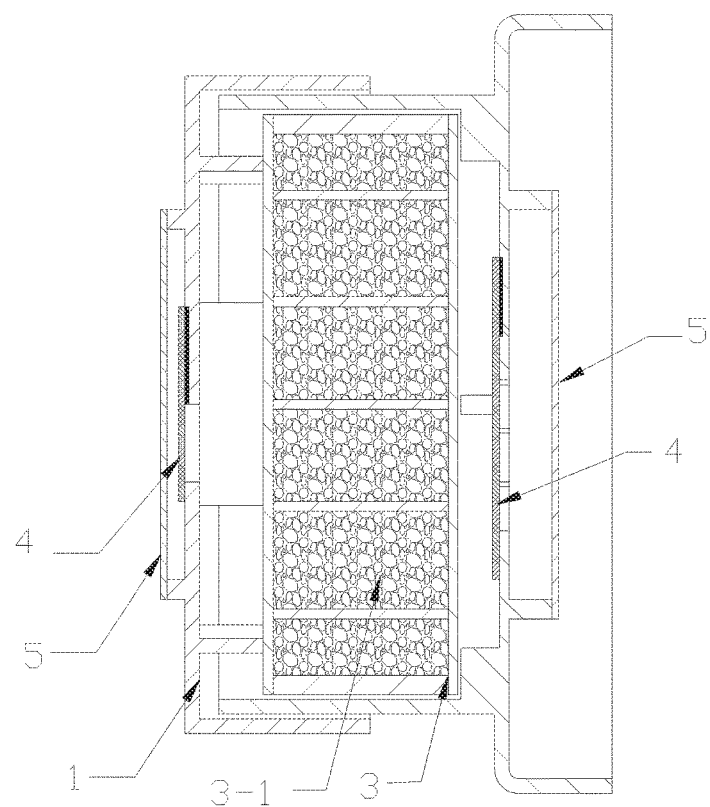
FIG. 3 is a schematic view of another preferred embodiment of the structure of a rear cover of a vehicle lamp having a valve structure and infrared radiation drying and air discharging function of the present application.

Referring to FIG. 1-FIG. 3, an embodiment of the present disclosure may include:

a rear cover of a vehicle lamp having a valve structure and infrared radiation drying and air discharging function, which may include an end cover 1 provided with a plurality of air vents 1-1, a connecting base 2 for connecting with a vehicle lamp housing, and a membrane module 3 for infrared radiation drying and air discharging. The end cover 1 and the connecting base 2 may be assembled and connected to form the rear cover of the vehicle lamp. The membrane module 3 may be built in a cavity of the rear cover of the vehicle lamp. At least one valve 4 may be provided on a path of air circulation inside and outside the vehicle lamp housing through the rear cover of the vehicle lamp, and the at least one valve automatically opens and closes under the impulse of air pressure difference.

The valve 4 may be only provided on the end cover 1, i.e. the rear cover is a single valve structure. As shown in FIG. 1, the valve may be provided on the air vents of the end cover. The valve 4 may be provided on both the end cover 1 and the connecting base 2, i.e. the rear cover is a double valve structure. The valve may be provided on the air vents of the end cover and the connecting base.

The valve 4 may be a silicone sheet or other plastic films. The valve may be fixed in a partial fixation manner or in a full fixation manner around the periphery of the valve. When the partial fixation is adopted, an unfixed portion automatically opens and closes under effect of air pressure difference, and when full fixation around the periphery is adopted, an opening in the form of a flap formed on the valve automatically opens and closes the valve under effect of air pressure difference.

As shown in FIG. 2, two valves 4 are partially fixed at different positions, i.e. one at the top and the other at the bottom. The unfixed portions automatically open and close under the effect of air pressure difference. As shown in FIG. 3, two valves 4 are partially fixed at the same position. The unfixed portions automatically open and close under the effect of air pressure difference.

Figure 4:
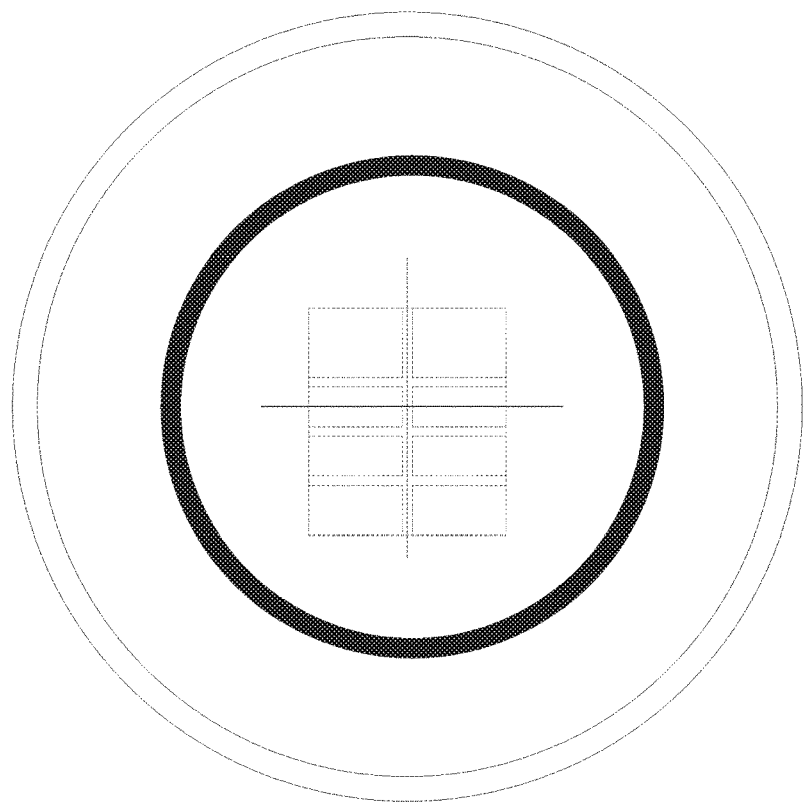
FIG. 4 is a schematic view of a preferred embodiment of a valve structure of the present application.
Figure 5:
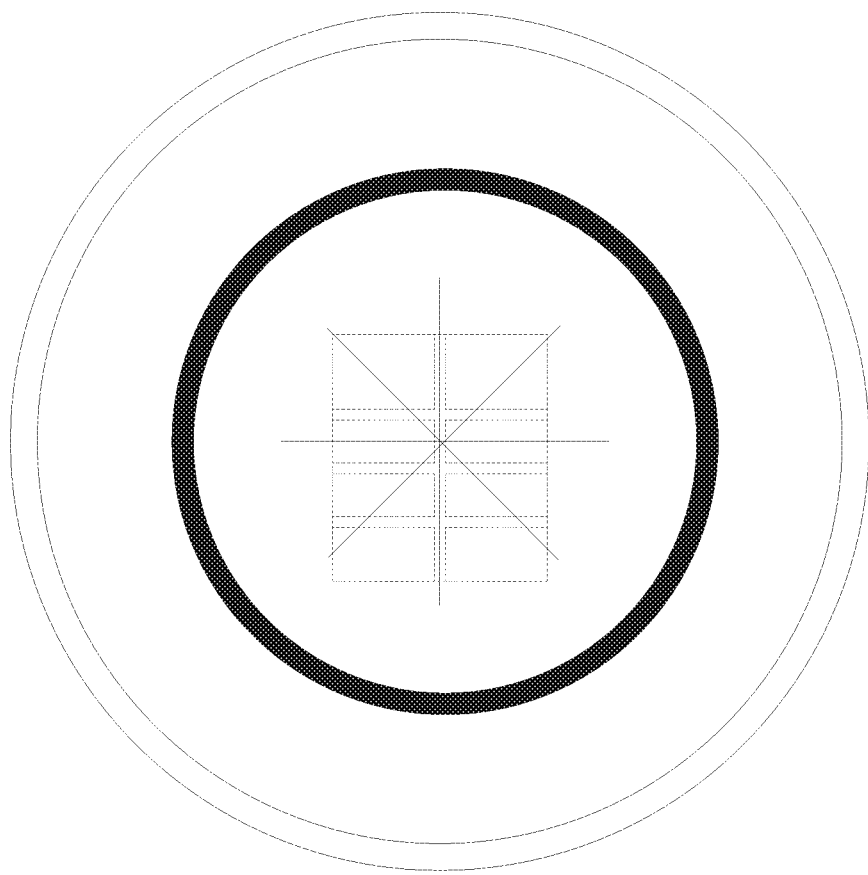
FIG. 5 is a schematic view of another preferred embodiment of a valve structure of the present application.

A circular valve may employ circumferential fixation or partial fixation. When circumferential fixation is adopted, a cross-shaped slot or a ✳-shaped slot may be formed at the center of the valve, as shown in FIGS. 4 and 5, and may automatically open and close under the effect of air pressure difference. This has the function of opening and discharging moisture under a slight change in air pressure. When partial fixation is adopted, the unfixed portion automatically opens and closes under the effect of air pressure difference.

A microporous membrane 5 may be provided on a periphery of the valve 4 for protecting the valve in a clean state. The microporous membrane 5 is preferably an expanded polytetrafluoroethylene microporous membrane. When the rear cover is a single valve structure, the expanded polytetrafluoroethylene microporous membrane 5 may be fixed on the end cover 1 on an outer side of the valve 4. When the rear cover is a double valve structure, the expanded polytetrafluoroethylene microporous membrane 5 may be mounted on the end cover 1 on an outer side of the valve 4 as well as on the connecting base 2. The way of connecting the expanded polytetrafluoroethylene microporous membrane 5 with the end cover 1 and the connecting base 2 is preferably welding connection. The expanded polytetrafluoroethylene microporous membrane 5 can be used to protect the valve 1 in the rear cover in a clean state, so as to realize sensitive and automatic opening and closing of the valve according to the change of air pressure difference.

The end cover 1 of the rear cover of the vehicle lamp and the connecting base 2 may be connected by welding, or glue, or other forms of connection, such as screw-type, snap-type, interference fit, etc. The connecting base 2 and the vehicle lamp housing may be connected by welding, or glue, or other forms of connection, such as screw-type, snap-type, interference fit, etc.

After a large number of experiments in harsh climate environments, the rear cover of the vehicle lamp having a valve structure and infrared radiation drying and air discharging function can effectively eliminate the phenomenon of fogging and condensation in a vehicle lamp. This can reduce costs and improve product quality for users.

The driving force for opening and closing of the valve 4 in the rear cover is the change in temperature inside and outside the vehicle lamp, resulting in an increase or decrease in air pressure inside the vehicle lamp, when the vehicle starts and stops with the lamp being turned on and off.

The maximum pressure difference between the inside and outside may reach several hundred Kpa. This can easily open and close the sensitive valve, discharge the humid air outward, and adjust and balance the pressure inside and outside. The infrared radiation heat energy generated when the vehicle lamp is turned on can keep the reversible moisture-absorbing substance in the membrane module for infrared radiation drying and air discharging dry such that it can have a strong and rapid absorption capacity, thereby maintaining a low humidity environment within the vehicle lamp, and having the effect of eliminating the internal fogging and condensation phenomenon.

In the rear cover of the vehicle lamp, the membrane module 3 for infrared radiation drying and air discharging may include: a cylindrical body and microporous membranes. The end faces on both sides of the cylindrical body may be connected with the microporous membranes. The interior of the cylindrical body may be in the form of straight through bores separated by honeycomb hollows. The interior can be filled with a large amount of a mixture 3-1 of a reversible moisture-absorbing micro-grain substance and substance micro-powder particles that can efficiently absorb far-infrared radiation energy.

The cylindrical body of the present disclosure is preferably an injection molded cylindrical body. The microporous membranes may be membranes having two-way convection capability and water vapor permeable channels, preferably expanded polytetrafluoroethylene (ePTFE) microporous membrane.

Expanded polytetrafluoroethylene (ePTFE) microporous membrane is a new macro-molecular membrane material having special function and high added value. It is made by bi-directional stretching with a special process. The micro-fiber of the membrane constitutes the inside and outside permeable micropores with a diameter of 0.1 $\mu m$~18 $\mu m$. This is a really breathable membrane. The surface of the membrane can reach several billion micropores per square inch, and the diameter of each micropore is less than the minimum value of light mist droplet (20 $\mu m$-100 $\mu m$). The expanded polytetrafluoroethylene (ePTFE) microporous membrane is resistant to environmental aging. It has an important application in the aspect of electrical and electronic waterproofing and air permeability.

The reversible substance in the mixture can quickly absorb large amount of water vapor gradually stored in a tiny micro-space, and can release and deliver water vapor. The reversible moist-absorbing micro-grain substance may be one or more of a strong water-absorbing and hydrophilic substance, such as reversible desiccant, bentonite, silica aerogel, carbon molecular sieve, carbon aerogel adsorbent and water-absorbing resin.

After the substance micro-powder particles that can efficiently absorb far-infrared radiation energy in the mixture receive infrared radiation energy from an object (such as vehicle lamp lighting or LED control module, ECU module), the temperature of the substance micro-powder particles that can efficiently absorb far-infrared radiation energy themselves increases, such that the temperature of the reversible moisture-absorbing substance increases accordingly, thereby speeding up the release of water vapor. The water vapor which is released from the reversible moist-absorbing substance in the cylindrical body can be transferred to the expanded polytetrafluoroethylene (ePTFE) microporous membrane to continuously discharge moisture, so that the reversible moisture-absorbing micro-grain substance gradually becomes dry, and maintains a continuous moisture-absorbing and moisture-discharging capacity. Hence, the moisture in the tiny micro-space of a vehicle lamp or the like can be kept at a relatively low level.

Far-infrared radiation refers to electromagnetic radiation with a wavelength between visible light and microwave. It is also called thermal radiation. Its short-wave limit is normally 0.75 $\mu m$, and its long-wave limit is about 1000 $\mu m$. The main method of generating far-infrared rays is to select materials with strong heat exchange ability, which can efficiently absorb and store heat energy from a heat radiation source, and emit far-infrared rays with specific wavelengths.

The substance micro-powder particles that can efficiently absorb far-infrared radiation energy mixed in the membrane module is beneficial in the enhancement of radiation heat transfer and absorption.

The sensitive substance micro-powder particles that can efficiently absorb far-infrared radiation energy may include one or more of the following materials:

Carbon element product: particles of carbon nanotubes, graphene, carbon aerogel, and carbon molecular sieve, etc.

Biochar: particles of high-temperature bamboo charcoal, bincho-charcoal, bamboo charcoal powder, bamboo charcoal powder fiber, and various products, etc.

Tourmaline: for example, tourmaline ore, tourmaline particles, tourmaline powder, tourmaline micro-powder textile fiber, and various products.

Far-infrared ceramics: particles formed by firing ceramics materials, such as tourmaline, Shenshan maifanitum stone, Guiyang stone, high negative ion volcanic rock, and far-infrared material that are mixed in different proportions for various purposes.

Zirconium carbide, metallic oxide, and silicon carbide: particles of zirconium carbide, dense porous metallic oxide (such as aluminum oxide), and loose porous silicon carbide material, etc. Zirconium carbide has the characteristics of efficient absorption of visible light, reflection of infrared light, and energy storage, etc. Since zirconium carbide has the characteristics of heat-absorbing, heat-storing and release of infrared ray, it can increase the temperature of a contact substance.

When the end faces on both sides of the cylindrical body are connected with the microporous membranes having two-way convection capability and water vapor permeable channels, moisture in the vehicle lamp housing enters the interior of the cylindrical body through the water vapor permeable channels, passes through the mixture of the reversible moisture-absorbing micro-grain substance and the substance micro-powder particles that can efficiently absorb far-infrared radiation energy, and is then discharged from the water vapor permeable channels. Air from outside is dried and filtered through the membrane module, and then enters the interior of the vehicle lamp housing. The air entering the vehicle lamp housing is dry air. At least one valve 4 may be provided on the path of air circulation inside and outside the vehicle lamp housing.

The assembling process of the rear cover of a vehicle lamp having a valve structure and infrared radiation drying and air discharging function may include: the valve 4 and the end cover 1 or the connecting base 2 are connected by welding, the membrane module 3 for infrared radiation drying and air discharging is welded on the end cover 1 or the connecting base 2 on one side of the valve 4, the end cover 1 is fixed to the connecting base 2 by welding or glue, the state of the valve 4 is checked, after passing the checking, the expanded polytetrafluoroethylene microporous membrane 5 is welded on the outer side of the end cover 1 for protection, and the assembly of the rear cover of the vehicle lamp is completed.

The method of manufacturing the membrane module for infrared radiation drying and air discharging may include: first, preparing the required parts of the module, welding and connecting the die-cut product of the microporous membrane to the end face on one side of the cylinder body, filling the cylinder body with a mixture of a reversible moisture-absorbing micro-grain substance and substance micro-powder particles that can effectively absorb far-infrared radiation energy, and finally welding a die-cut product of the microporous membrane to the end face on the other side of the cylinder body to complete the preparation of the module.

The cylindrical body may be an injection molded part, preferably an injection molded circular cylinder. The preparation method may include: drying and loading a plastic masterbatch, removing the flash and burr after injection into the injection molding machine and demolding, and then transferring to the next process after inspection.

The preparation of the mixture of the reversible moisture-absorbing micro-grain substance and substance micro-powder particles that can efficiently absorb far-infrared radiation energy may include: preparing a single ingredient or various organic combination ratios of strong hydrophilic and water-absorbing substances, such as reversible desiccant (e.g. magnesium chloride and its crystalline hydrate, etc.), bentonite, silica aerogel, carbon molecular sieve, carbon aerogel adsorbent, and water-absorbing resin; stirring it evenly with substance micro-powder particles that can efficiently absorb far-infrared radiation energy to form a mixture having different price levels and moisture-absorbing and moisture-discharging capabilities; and after inspection, transferring it to the next process to be filled into the cylindrical body.

The die-cut product of the microporous membrane may be a die-cut product of a membrane having bi-directional convection capability and water vapor permeable channels.

A modification treatment of a hydrophobic and oleophobic surface can be a modification of the surface of the expanded polytetrafluoroethylene membrane by grafting a polymer chain rich in fluorine atoms, so that the tension of the modified membrane surface is reduced to less than 20 dynes/cm, and water droplets and oil droplets can quickly roll off the membrane surface.

The preparation of a die-cut product of the membrane having water vapor permeable channel may include: first, the membrane is die-cut into a circular sheet; and after inspection, it is transferred to the next process to be welded to a cylindrical body. The preferred membrane of the present disclosure is an expanded polytetrafluoroethylene membrane.

When both sides of the cylindrical body are welded with the die-cut product of the membranes having two-way convection capability and water vapor permeable channels, moisture in the vehicle lamp housing enters the interior of the cylindrical body through the water vapor permeable channels, passes through the mixture of the reversible moisture-absorbing micro-grain substance and the substance micro-powder particles that can efficiently absorb far-infrared radiation energy, and is then discharged from the water vapor permeable channels. Air from outside is dried and filtered through the membrane module and then enters the interior of the vehicle lamp housing. The air entering the vehicle lamp housing is dry air. This can also play a role in balancing the pressure inside and outside.

The innovative application of the membrane module for infrared radiation drying and air discharging in the rear cover of the vehicle lamp can speed up the ability of discharging moisture out of the vehicle lamp, so that the performance of illumination of the vehicle lamp can be effectively and reliably sustained, the safety of driving can be improved.

In summary, the present application provides a rear cover of a vehicle lamp having a valve structure and infrared radiation drying and air discharging function, which can ensure that there is no fogging and condensation in the housing of a vehicle lamp and electrical and electronic equipment, so that electrical performance will not be affected by humid air environment, and the surfaces of mirrors and smooth electronic components in the housing of electrical and electronic equipment of a vehicle will not become foggy, and the performance of the electrical and electronic equipment of the vehicle can be brought into play. This completely subverts the traditional methods of controlling and adjusting humidity in the housing of a vehicle in Europe, America and Japan. This can also block the entry of dust so that the electrical and electronic equipment in a vehicle is pollution-free and at a dust-tight level.

The use of sensitive substance micro-powder particles that can efficiently absorb far-infrared radiation energy to heat up the reversible moisture-absorbing substance can speed up the release of water vapor of the reversible moisture-absorbing substance and restore the moisture-absorbing capacity. This is beneficial to the performance of the membrane module, and it does not increase the user's costs and energy consumption. It is easy to install. This is an innovative application of infrared radiation non-contact heating technology on this membrane module.

It makes full use of self-adjustment of the rear cover of the vehicle lamp itself which is located near the far-infrared radiant energy of the lamp bulb heating source. The temperature inside the housing in this location is also very high. A vehicle lamp will reach a high temperature of 75° C. when it is turned on. After the substance micro-powder particles that can efficiently absorb far-infrared radiation energy receive infrared radiation energy from an object (such as vehicle lamp lighting or LED control module, ECU module), the temperature of the substance micro-powder particles that can efficiently absorb far-infrared radiation energy increases, and the temperature of the reversible moisture-absorbing substance increases accordingly to speed up the release of water vapor. The membrane module has the sustained ability to quickly absorb and release in an instant the water vapor in a tiny micro-space, so that the reversible moisture-absorbing micro-grain substance can continue to release and discharge water vapor. It can also quickly absorb the micro moisture in the lamp housing and transfer it to the expanded polytetrafluoroethylene microporous membrane to release water vapor molecules to the external environment. The reversible moisture-absorbing micro-grain substance can be kept dry and have continuous moisture-absorbing ability. When the vehicle lamp is turned off, the reversible moisture-absorbing micro-grain substance dried by the lighting of the vehicle lamp can continuously absorb and discharge water vapor molecules in the vehicle lamp housing, so that the space in the vehicle lamp housing can maintain a dry state with low humidity. This important innovative technology of continuously lowering the humidity in a tiny micro-space can eliminate the pre-requisite for fogging and condensation of such vehicle lamps.

The present disclosure can improve the ability to continuously discharge moisture in the vehicle lamp housing to the external environment, so that the humidity inside the tiny micro-space such as a vehicle lamp housing can be reduced to a very low level, and the space inside is very dry and the humidity is much lower than RH35%~40%. This eliminates the main reason for fogging and condensation in a tiny micro-space such as a vehicle lamp housing—the factor of water vapor of high humidity.

The cost of using membrane module for infrared radiation drying and air discharging is low. A user can save a lot of investment and reduce costs after using it, and can achieve good results.

The use of the membrane module for infrared radiation drying and air discharging can be combined with ventilating rear cover or cap on a tiny micro-space housing of a vehicle lamp housing or the like. It is not necessary to change the design and structure of the tiny micro-space housing of the vehicle lamp housing. It is convenient to use. It is convenient for mass production and assembly to meet customer's needs.

The above-mentioned are only embodiments of the present disclosure, and are not intended to limit the scope of protection of the present disclosure. Any equivalent structure or equivalent process, or other direct or indirect application in other related technical field made by utilizing the description of the present disclosure shall fall within the scope of patent protection of the present disclosure.

What is claimed is:

1. A rear cover of a vehicle lamp having a valve structure and infrared radiation drying and air discharging function, comprising:
    an end cover provided with a plurality of air vents;
    a connecting base for connecting with a vehicle lamp housing;
    a membrane module for infrared radiation drying and air discharging, wherein the end cover and the connecting base are assembled and connected to form the rear cover of the vehicle lamp, the membrane module is built in a cavity of the rear cover of the vehicle lamp; and
    at least one valve provided on a path of air circulation inside and outside the vehicle lamp housing through the rear cover of the vehicle lamp, and the at least one valve automatically opens and closes under impulse of air pressure difference.

2. The rear cover according to claim 1, wherein the valve is only provided on the end cover, or the valve is provided on both the end cover and the connecting base.

3. The rear cover according to claim 2, wherein a microporous membrane is provided on a periphery of the valve for protecting the valve in a clean state.

4. The rear cover according to claim 1, wherein the valve is fixed in a partial fixation manner or in a full fixation manner around the periphery of the valve, when the partial fixation is adopted, an unfixed portion automatically opens and closes under effect of air pressure difference, and when full fixation around the periphery is adopted, an opening in the form of a flap formed on the valve automatically opens and closes the valve under effect of air pressure difference.

5. The rear cover according to claim 1, wherein the valve is a silicone sheet or a plastic film.

6. The rear cover according to claim 1, wherein the membrane module for infrared radiation drying and air discharging comprises a cylindrical body and microporous membranes, wherein end faces on both sides of the cylindrical body are connected with the microporous membranes, an interior of the cylindrical body is in the form of straight through bores separated by honeycomb hollows, and the interior is filled with a mixture of a reversible moisture-absorbing micro-grain substance and substance micro-powder particles that efficiently absorb far-infrared radiation energy.

7. The rear cover according to claim 6, wherein the microporous membranes are membranes having two-way convection capability and water vapor permeable channels.

8. The rear cover according to claim 7, wherein when the end faces on both sides of the cylindrical body are connected with the membranes having two-way convection capability and water vapor permeable channels, moisture in the vehicle lamp housing enters the interior of the cylindrical body through the water vapor permeable channels, passes through the mixture of the reversible moisture-absorbing micro-grain substance and the substance micro-powder particles that efficiently absorb far-infrared radiation energy, and is discharged from the water vapor permeable channels, and
    air from outside is dried and filtered through the membrane module and then enters an interior of the vehicle lamp housing, the air entering the vehicle lamp housing is dry air, at least one valve is provided on the path of air circulation inside and outside the vehicle lamp housing.

9. The rear cover according to claim 6, wherein the reversible moisture-absorbing micro-grain substance is one or more of a reversible desiccant, bentonite, silica aerogel, carbon molecular sieve, carbon aerogel adsorbent and water-absorbing resin; and the substance micro-powder particles that efficiently absorb far-infrared radiation energy comprise one or more of a carbon element product, biochar, tourmaline, far-infrared ceramics, zirconium carbide, metallic oxide, and silicon carbide.

* * * * *